J. C. DUNLOP.
HAND CAR.
APPLICATION FILED AUG. 4, 1909.

949,418.

Patented Feb. 15, 1910.

Inventor
John C. Dunlop.

Witnesses

By C. A. Snow & Co.
Attorneys

UNITED STATES PATENT OFFICE.

JOHN C. DUNLOP, OF MINIER, ILLINOIS.

HAND-CAR.

949,418.  Specification of Letters Patent.  Patented Feb. 15, 1910.

Application filed August 4, 1909. Serial No. 511,134.

*To all whom it may concern:*

Be it known that I, JOHN C. DUNLOP, a citizen of the United States, residing at Minier, in the county of Tazewell and State of Illinois, have invented a new and useful Hand-Car, of which the following is a specification.

This invention has reference to hand cars and is designed to provide a car that will be operated by a pull and push propelling motion, thus eliminating the old style pumping motive power and greatly facilitating the ease with which the car is operated.

It further contemplates a car of this type and character which, through the provision of a momentum or fly wheel rigidly secured to the operating shaft, will aid in carrying the propelling lever and link past the dead center.

A further object is to provide a driving mechanism so arranged that the operator may be seated when propelling the car, the motion required for the propulsion thereof being similar to that of rowing.

Figure 1:
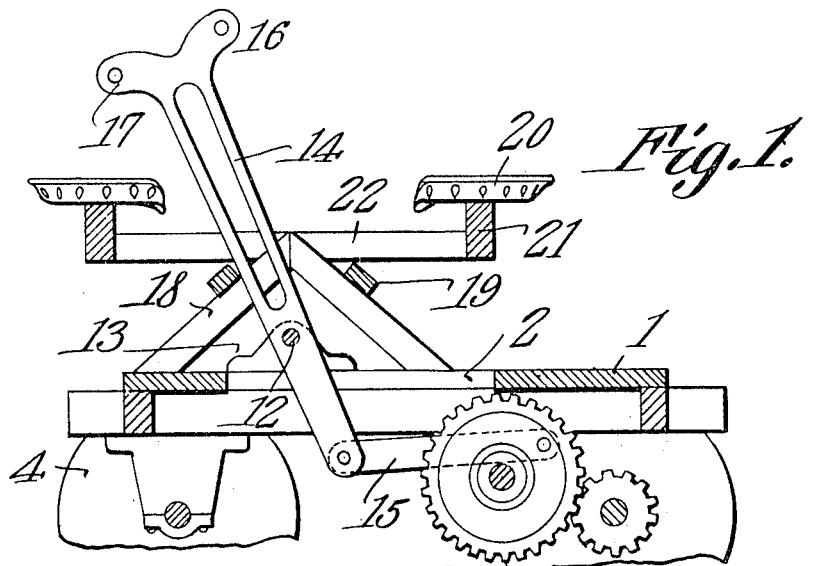
Figure 2:
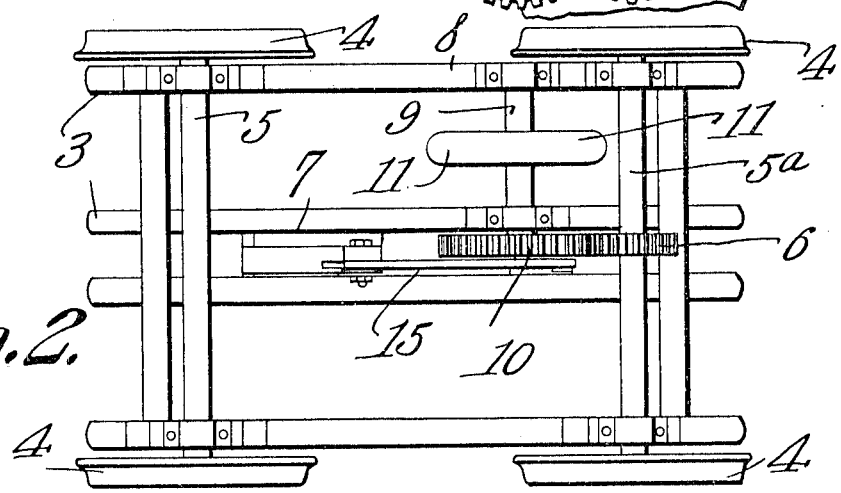
Figure 3:
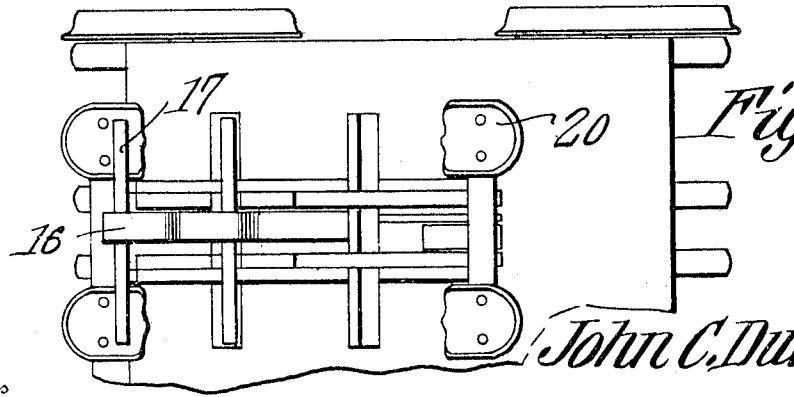

With the above and other objects in view, this invention consists in the construction, combination and arrangement of parts all as hereinafter more fully described and specifically claimed and illustrated in the accompanying drawings, wherein:

Figure 1 is a central vertical longitudinal section. Fig. 2 is a bottom plan view of a car constructed in accordance with my invention. Fig. 3 is a top plan view showing the arrangement of the seats thereon.

The hand car forming the subject matter of the present invention comprises the platform 1 having a longitudinally extending slot 2 formed therein and the hand holds 3 disposed at each extremity thereof. Secured to the under face of this platform in the usual manner are the wheels 4, journaled on the axles 5, said axles being mounted on the outer longitudinally extending beams 8. One of said axles adapted to driving the car is provided with the small gear 6 rigidly secured thereon and of sufficient size to operate below the platform.

Arranged along each side of the slot 2 are the longitudinally extending intermediate beams 7, so situated as to form a journal and brace for the driving mechanism. Journaled between one of the outer beams 8 and the adjacent intermediate beams 7 is an operating shaft 9, disposed in spaced parallel relation to the driving axle 5ª and having a large driving gear 10 mounted on its inner terminal between the intermediate braces 7 adapted to mesh with and drive the gear 6.

Rigidly secured to the shaft 9, between the beams 7 and 8, is a momentum or fly wheel 11, so that the operating mechanism may be carried easily past the dead center when the car is in use.

Pivotally secured by the pin 12 journaled in the bearings 13 on each side of the slot 2 is the operating lever 14 connected at its lower extremity by the link 15 to the gear 10 in such a manner that, upon reciprocation of the link, the gear will rotate and in turn rotate the axle 5, thus causing the car to move. In its upper end the lever 14 is bifurcated to form the branches 16 through which the operating handles 17 are passed, forming four hand holds.

To provide a means whereby the link 15 will in no way become displaced from its normal position in relation to the gear 10 and the lever 14, a tapering frame 18 spans the opening 2, having secured thereon transverse braces and stops 19 which are so situated that the lever has only sufficient room to operate the gear 10. These braces 19 form in their construction a foot brace for the operator seated in the seat 20 carried by the transverse beam 21, supported by the longitudinally extending beam 22, secured to the apex of the frame 18.

The operators of a car constructed after my improved method remain seated, having their feet resting on and braced against the cross bars 19 and are able to obtain more power and speed from the car due to the fact that they are in a position to apply a force from the leg and back muscles as well as from the arm muscles; whereas in cars heretofore, wherein the pumping propelling motion is employed, the arm is the only part of the body brought into direct play upon the levers. It will further be noticed that the entire power is applied in a direct pull and is consequently more effective than the old method.

From the foregoing it will readily be seen that the provision of the fly or momentum wheel 11 on the operating shaft 9 will cause the car to run with an even smooth motion so that the jerkiness caused in handcars heretofore by the loss of power in carrying the lever past the dead center is obviated.

Having thus described my invention, what I claim as new and desire to secure by U. S. Letters Patent is:

1. In a car of the class described, the combination with a platform having a centrally disposed longitudinally extending slot therein, downwardly projecting, longitudinally extending beams adjacent said slot, a gear carried on one axle between said beams, an operating shaft journaled between one of said beams and the outer side of the platform, having its extremity extending over the space between said beams, a gear carried on said extremity and meshing with the gear on the axle, a lever pivoted between the sides of said slot and connected by a link to the gear on said operating shaft.

2. In a car of the class described, the combination with a platform having longitudinally extending side beams, and a centrally disposed longitudinal slot therein, of beams disposed on each side of said slot, of gears secured between said beams on one of the axles of said car, an operating shaft carried between one of the side beams and the adjacent intermediate beam and projecting over the space between the intermediate beams, said projecting portion carrying a gear meshing with the axle gear, a lever carried between the sides of the slot and connected to the gear carried by said operating shaft by a link, and a momentum wheel rigidly secured to said operating shaft between the intermediate and side beams.

3. In a car of the class described, the combination with a platform having extreme and intermediate longitudinally extending beams, and a slot piercing said platform between said intermediate beams, an operating shaft carried between one of said intermediate beams and the adjoining extreme beam and projecting over the intermediate space between said intermediate beams, said projection carrying a gear adapted to mesh with and rotate a gear carried on one of the axles, a lever pivoted between the sides of said slot and connected at its lower extremity to the gear carried by said operating shaft by a link, a frame spanning said slot and having transverse stops thereon adapted to limit the swing of said lever, and a momentum wheel carried between said outer and intermediate beams on the auxiliary shaft.

4. In a car of the class described, the combination with a platform, having a longitudinally extending centrally disposed slot therein, of a lever pivoted between the sides of said slot, meshing gears carried on the under face of said platform, one gear being rigidly secured to the axle of the car, the other of said gears being connected by a link to the lever, a frame spanning said slot having transverse stops thereon to limit the motion of said lever, a plurality of seats on said frame, and means whereby the lever may be operated from said seat.

5. In a car of the class described, the combination with a platform having a centrally disposed, longitudinally extending slot therein, of a lever pivoted between the sides of said slot, meshing gears carried on the under face of said platform adjacent said slot, one of said gears being rigidly secured to one of the axles of the car, the other being connected by a link to the lower extremity of said lever, and transverse handles secured to the other extremity of said lever, and a tapering frame spanning said slot, carrying a plurality of seats thereon and having stops, adapted to limit the movement of the lever.

In testimony that I claim the foregoing as my own, I have hereto affixed my signature in the presence of two witnesses.

JOHN C. DUNLOP.

Witnesses:
J. O. LING,
ROY J. LING.